UNITED STATES PATENT OFFICE 2,099,686

ORGANIC ARSENIC COMPOUNDS

Cliff S. Hamilton, Lincoln, Nebr., assignor to Parke, Davis & Company, Detroit, Mich., a corporation of Michigan No Drawing. Application July 19, 1933,
Serial No. 681,226

19 Claims. (Cl. 260—14)

This invention is concerned with new organic compounds containing arsenic. More specifically, the invention relates to a new class of aromatic arsenicals, in which arsenic is attached to the benzene ring.

Many hundreds of organic arsenicals have already been prepared and tested for their therapeutic value. However, most of those made in recent years have merely been new members of an already well known class of compounds, the preparation of new types of organic arsenicals being comparatively rare, in spite of active and extensive research in the field of arsenicals. Furthermore, of the many kinds of organic arsenicals which have been tested, only a comparatively small number have proved to be therapeutically active, and of those found to be active, only a very small number also are sufficiently active and yet non-toxic to be of practical use.

I have discovered a new class of aromatic arsenicals in which an aryl group, such as phenyl, having arsenic attached to the aryl nucleus, is joined through oxygen to a radical containing an alcohol group. In other words, arsenic is attached to the nucleus of an aryloxy alkanol group. Thus, the new compounds are at the same time alcohols and ethers, due to the ether oxygen linkage with the aryl nucleus.

I have further found, by preparing and testing a whole series of compounds under this class, that they are active in treating trypanosome or spirochete infections, such as syphilis. Apparent the alkanol radicle united to the benzene ring by oxygen has a powerful influence in determining the therapeutic activity of my new compounds. It does not appear that a similar relationship has yet been found for any other entire group in the field of organic arsenicals.

The type formula for the new arsenicals may be given as R—O—R' in which R is an aromatic nucleus, such as a benzene ring, carrying arsenic as a direct substituent and which may or may not contain other substituents. The arsenic atom attached to a carbon atom of the benzene ring as a substituent may be trivalent or pentavalent. R' of the formula is a substituted or unsubstituted alkyl group (straight or branched chain) containing one or more alcohol groups.

As an example under the type formula, some of the simpler members are the isomeric-hydroxyethoxy-phenyl arsonic acids, represented by the following formula:

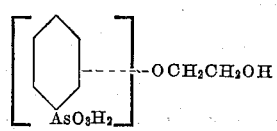

The para isomer may be represented as follows:

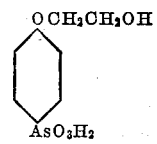

Referring to the general formula, R in this compound is $C_6H_4AsO_3H_2$ and R' is —$CH_2$—$CH_2OH$, the arsenic of the group R being pentavalent and in the form of an arsonic acid (—$AsO_3H_2$) group.

I have prepared many compounds in which the aromatic nucleus of R of the above general formula contains other substituents than merely arsenic and the R'—O-group. Merely by way of illustrating the invention, a few of such substituents are here given. These are amino-, substituted amino-, nitro-, sulfo-(—$SO_2OH$ and —$SO_2ONa$, etc.), and halogen groups. In the case of amino groups which are secondary, (—NHR''), or tertiary, (—NR''R''', —RR''R'', —NR'''R'''), R'' or R''' may be any of the following:

—$CH_2CH_2OH$, —$CH_2CH_2CH_2OH$,
  —$CH_2SO_2H$, —$CH_2SO_2X$, —$CH_2SO_3H$,
    —$CH_2SO_3X$, —$CH_2COOH$, —$CH_2COOX$,
      —$CH_2CONH_2$, —$CONH_2$, etc., where X is H, a metal or salt-forming group.

In the case of R' of the formula, this may be

—$CH_2CH_2OH$, —$CH_2CH_2CH_2OH$,
  —$C(CH_3)_2CH_2OH$, —$CHOH$—$CH_2OH$,
    —$CHOH$—$CH_3$, —$CHOHCONH_2$, etc.

However, it will be noted that in all of these illustrative examples, R' is an alkyl group containing one or more alcohol groups.

The arsenic attached to the aromatic nucleus of R may be trivalent or pentavalent. As examples, the following and other like groups may be present in the compounds of my invention:

—$AsO_3H_2$, —$AsO$, —$As(SCH_2COOH)_2$,
  —$As(SCH_2COOX)_2$, —$As$=$As$—, etc., where X is H, a metal or salt-forming group. In the specification and claims, where arsenic is referred to as a substituent of an aromatic nucleus, arsenic in any of these forms or valences is referred to.

I have also found that certain of the new compounds are outstanding for the high value of their therapeutic index, that is, the ratio of minimum dosage required for causing death of the animal being treated to the dosage needed to effect its cure. Thus, unexpectedly high values were obtained for the group comprising those compounds wherein R of the above general formula represents a simple arsenic substituted benzene nucleus or an amino and arsenic substituted benzene nucleus. For example, about the most active compound of this group was para-arsono-ortho-amino-phenoxyethanol, the formula for which is

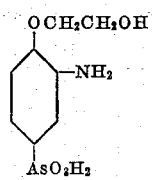

By the name para-arsono-ortho-amino-phenoxyethanol, as given in the specification and the appended claims, I wish to include not only the free base, but also its equivalents in the form of salts, such as the hydrochloride or sodium salts of the free base. Naturally, this designation does not include any substituted derivatives, however simple. For example, the N-acetyl derivative is not included in this designation. Although I have made this compound and have found that it is active therapeutically and included in the broad features of the invention, the free base from which it is derived is far more active.

In using the compounds of my invention in the treatment of trypanosome or spirochete infections, they may be administered orally or hypodermically. The most convenient form for oral administration is to use a water soluble salt of the compound such as the sodium salt. Other soluble salts which come within the purview of the invention are the potassium, ammonium, lithium and calcium salts but these are to be considered as illustrative only. For hypodermic use the arsonic acid salts may be used as such or reduced to the arseno (—As=As—) compounds or to the intermediate arsenoxides (—As=O) and used as such or in the form of derivatives.

The following examples will serve to illustrate the invention:

*Example 1* p-Arsono-phenoxy-ethanol

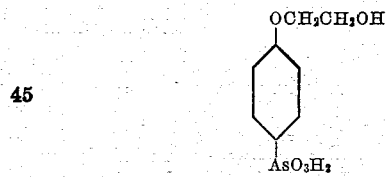

A solution of 218 g. of p-hydroxy-phenylarsonic acid in 750 cc. of 6 N sodium hydroxide is cooled to 20° C. and 132 cc. (two equivalents) of ethylene chlorohydrin added and the solution warmed gently. After refluxing for four hours the solution is filtered, cooled and acidified with 200 cc. of 12 N hydrochloric acid. Recrystallization gives white hexagonal plates (145–160 g.). M. P. 128° (uncorr.). The product is very soluble in water (hot) and alcohol and slightly soluble in benzene and ether. Analysis: Subs. 0.1874, 0.1874 g.: 28.60, 28.61 cc. of 0.0500 N KBrO₃ solution. Calcd. for $C_8H_{11}O_5As$: As, 28.61%. Found: As, 28.61, 28.60%.

In a similar manner the corresponding ortho and meta compounds, o-arsono-phenoxyethanol and m-arsono-phenoxyethanol, may be prepared.

*Example 2*

4-Arsono-2-nitro-phenoxy-ethyl nitrate

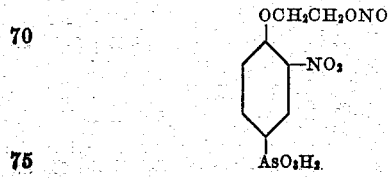

100 cc. beaker containing 40 cc. nitric acid (1.52) was surrounded by a bath of water at 20° C. While the solution was stirred mechanically, 20 g. 4-arsono-phenoxyethanol was added slowly over a period of ten minutes. Stirring was continued for three hours and then the solution was poured into 600 cc. cold water. The ester separated immediately as white needles, which were filtered off and washed with cold H₂O. It was redissolved in one liter of hot water, filtered through a hot water funnel, and allowed to stand several hours in the refrigerator. The product, 4-arsono-2-nitro-phenoxy-ethyl nitrate separated as long white needles. Weight, 22.4 g. Yield, 84%. M. P. 217–8° with decomposition (uncorr.). The solution of this compound in alkali had a faint yellow tinge.

Analysis: Subs. 0.1874, 0.1874 g.; 21.30, 21.33 cc. of 0.0500 N KBrO₃ solution. Calcd. for $C_8H_9O_9N_2As$; As, 21.30%. Found: As, 21.30, 21.33%.

*Example 3*

4-Arsono-2-nitro-phenoxyethanol

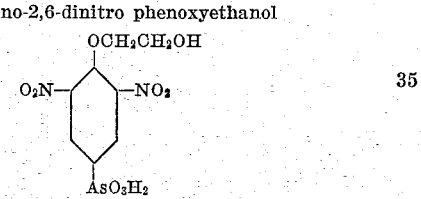

and

4-Arsono-2,6-dinitro phenoxyethanol

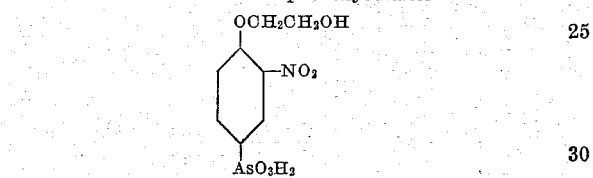

A suspension of 25 g. 4-arsono-2-nitro-phenoxy-ethyl nitrate in 100 cc. 3 N hydrochloric acid was placed in a 250 cc. round bottom flask and refluxed two hours. The solution was cooled, filtered, and the filtrate made faintly alkaline to litmus by addition of 6 N sodium hydroxide.

During this time the ester passed completely into solution and the brown fumes of nitrogen dioxide were seen escaping from the top of the condenser.

The dinitro compound, that is,

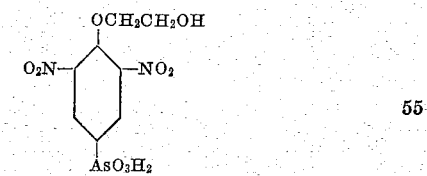

is also produced along with the 2-nitro compound by the following procedure:

A solution of 10 g. 4-arsonophenoxyethanol in 20 cc. of concentrated sulfuric acid was cooled to 0° C. and 5.5 cc. (3+eq.) nitric acid (1.52) in 4.5 cc. concentrated sulfuric acid was added drop-by-drop during 30 minutes. The solution was heated on the water bath for one hour at which time a green coloration appeared. It was poured on ice and 6 N sodium hydroxide was added until the solution was neutral to Congo red paper. The 4-arsono-2,6-dinitro-phenoxyethanol separated as a yellow precipitate. It was filtered off and the filtrate saved for the next part. The yellow precipitate was recrystallized from 200 cc. of water and separated as light yellow diamond-shaped plates, soluble in water at 20° to the extent of .3 g./100 cc. It melted at 212–5° and decomposed at 228°. It was intensely violet in alkaline solution.

Analysis: Subs. 0.1874, 0.1874 g.: 21.32, 21.30 cc. of 0.0500 N KBrO₃ solution required. Calcd. for C₈H₉O₉N₂As, As 21.30%. Found: As 21.32, 21.30%.

The filtrate mentioned above was made neutral to litmus and evaporated to dryness on the water bath. It was extracted with acetone and the acetone evaporated, extracted with hot water, and the aqueous solution treated with charcoal and concentrated. A crop of yellow plates was obtained, weight 3.4 g. It was quite soluble in water and formed an intense yellow solution from which it crystallized as well-formed yellow plates. Darkened below 275°, but did not melt below 300°. It was yellow-brown in alkaline solution.

Analysis: Sub. 0.1874, 0.1874; 24.46, 24.51 cc. of 0.0500 N KBrO₃ required. Calcd. for C₈H₁₀O₇NAs, As 24.41%. Found: 24.46, 24.51% As.

The dinitro compound was insoluble in acetone so that this furnished the basis for a separation.

*Example 4*

4-Arsono-2-amino-phenoxyethanol and its hydrochloride

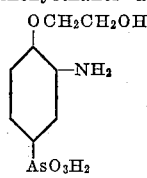

The hydrolyzed solution of 4-arsono-2-nitro-phenoxyethanol nitrate is made alkaline and added with shaking and cooling to an alkaline solution of 150 g. of ferrous chloride (FeCl₂.4H₂O)

in 175 cc. of water. The reaction mixture is filtered and the filtrate is made faintly acid (HCl) to Congo red paper and evaporated to dryness at diminished pressure. The residue is extracted with methyl alcohol, the methyl alcohol solution boneblacked, filtered and taken to dryness. The dry methyl alcohol residue comprising the free base is dissolved in n-butyl alcohol and diethyl ether and 4-arsono-2-amino-phenoxyethanol obtained as the hydrochloride by the addition of dry hydrogen chloride in alcohol. The product is a granular solid. Wt.=11.2 g. M. P. 169° with decomposition (uncorr.).

Analysis: Subs. 0.1874. 0.1874, 0.1874: 23.76, 23.70, 23.70 cc. of 0.0500 N KBrO₃ solution. Calcd. for C₈H₁₂O₅ N As HCl: As, 23.90%. Found: As 23.76, 23.70, 23.80%. Neutral equivalent: 0.1000, 0.1000 g., found: 5.90, 5.93 cc. of 0.1057 N sodium hydroxide. Calcd. for C₈H₁₂O₅—N as HCl based on two equivalents, 6.03 cc.

The free base was prepared and isolated as follows:

The solution obtained by hydrolysis of 40 g. of 4-arsono-2-nitro-phenoxy-ethyl nitrate was made faintly alkaline to litmus with 6 N sodium hydroxide. A solution of 240 g. ferrous chloride (FeCl₂.4H₂O) in 280 cc. of water was also made alkaline to litmus with 6 N sodium hydroxide and the alkaline hydrolysis solution was added with shaking and cooling. The mixture assumed the characteristic dark brown color of ferric hydroxide. After shaking and allowing to stand for ten minutes the mixture was filtered through a large Buchner funnel. The residue was suspended in 250 cc. of water, 10 cc. of 6 N sodium hydroxide added, the mixture thoroughly stirred while heated to boiling, filtered while hot, and the filtrate combined with the previous one. The filtrates were evaporated under reduced pressure until the volume was about 300 cc. Hydrochloric acid (6 N) was added until a drop of the solution changed Congo red paper to purple. The solution was evaporated to dryness under reduced pressure and the residue was dried in the vacuum oven at 70° C. The amine was extracted with about 400 cc. of synthetic methyl alcohol. The alcoholic solution was heated to boiling, decolorized with charcoal, filtered, and evaporated to dryness under reduced pressure. The residue was dissolved in 150 cc. of water, decolorized with charcoal, and cooled in the refrigerator. Crystallization was initiated by scratching the walls of the beaker, after which the solution changed rapidly to a mass of needle-like crystals. It was filtered while cold through a cold Buchner funnel and washed with several 15 cc. portions of ice water. Further crops of crystals were obtained by repeated concentrations of the filtrates. Total yield, 20.4 g. This product contained a mixture of the amine and the amine hydrochloride and the approximate percentage of each was determined by means of the neutral equivalent. The product was dissolved in 150 cc. of hot water and sufficient 3 N sodium hydroxide added to react with the HCl liberated. The solution was decolorized with charcoal, filtered and upon cooling the amine separated as white rods. The solution was cooled to 0° C., filtered, and washed with several 15 cc. portions of ice water. Further yields of the amine were obtained by concentrating the filtrate. The amine was dried in the desiccator and then in the oven at 110° C. Total yield, about 14.5–16 g. or 45–50% based upon a theoretical yield of 31.4 g. M. P. 156–7° C. with slight decomposition (corrected).

Analysis: Subs. 0.1874, 0.1874: 27.06, 27.08 cc. of 0.0500 N KBrO₃ solution. Calcd. for C₈H₁₂O₅—N As, 27.5%. Found: As, 27.06, 27.08%.

*Example 5*

Mono-sodium salt of 4-arsono-2-amino-phenoxyethanol

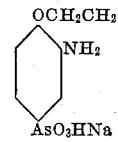

A solution of 2 g. of 4-arsono-2-amino-phenoxyethanol in 3.6 cc. of 2 N sodium hydroxide was made exactly neutral to litmus and added drop-by-drop to 150 cc. of cold 95% ethyl alcohol with mechanical stirring. The mono-sodium salt separated as white granular crystals, which were filtered, washed well with alcohol, and dried at 110° C., yield, 2.0 g. It was quite soluble in cold ethylene glycol, moderately soluble in cold glycerol, and insoluble in alcohol, acetone, chloroform, and ethyl acetate.

Analysis: Subs. 0.1874, 0.1874: 25.08, 25.10 cc. of 0.0500 N KBrO₃ solution required. Calcd. for C₈H₁₁O₅ N As Na, As, 25.06%. Found: As, 25.08, 25.10%.

The mono-sodium salt was also prepared by precipitation with absolute ethyl alcohol. It separated as a sticky mass which rapidly crystallized. When thus prepared it readily absorbed one molecule of water of crystallization from the atmosphere.

Analysis: Calcd. for C₈H₁₁O₅NAsNaH₂O, H₂O, 5.68%. Found: H₂O, 5.69, 5.96%.

A sample of the mono-sodium salt precipitated from 95% alcohol was allowed to dry several days in air, weighed, and dried at 110° C. The loss in weight at 110° C. corresponded to one molecule of water of crystallization. The dry salt absorbed water very slowly.

When this preparation was tested therapeutically on trypanosomes it showed a therapeutic index far in excess of the known substances of this type.

Example 6

4-Arsinoso-phenoxyethanol

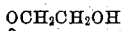
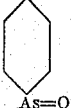

A solution of 12 g. 4-arsonophenoxyethanol in 42 cc. 3 N hydrochloric acid containing .3 g. potassium iodide was saturated with sulfur dioxide gas at room temperature for four hours. The flask was cooled to 0° and the liquid decanted and discarded leaving the crude oxide as a pasty mass. It was dissolved in 25 cc. 3 N sodium hydroxide and the solution diluted to 75 cc. and filtered. The filtrate was cooled to 15° C. and the oxide precipitated by adding 3 N hydrochloric acid slowly while stirring until neutral to litmus. The white flocculent precipitate thus formed was filtered, washed well with water, and dried in the vacuum oven at 45°. The yield was 9.4 g. or 90% based upon a theoretical yield of 10.4 g. It was redissolved in 20 cc. 3 N sodium hydroxide, diluted to 66 cc., filtered, cooled to 15 C. and the oxide reprecipitated by adding 3 N hydrochloric acid slowly drop-by-drop with constant stirring. It was filtered and the precipitate washed well with water and dried in the vacuum oven. Weight, 7.4 g.

Analysis: Subs. 0.1874, 0.1874: 32.42, 32.36 cc. of 0.0500 N KBrO$_3$ solution. Calcd. for C$_8$H$_9$O$_3$ As: As 32.86%. Found: As 32.43, 32.36%.

Example 7

4-Arsinoso-2-amino-phenoxyethanol

and

4-Dichloroarsinoso-2-amino-phenoxyethanol hydrochloride

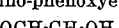
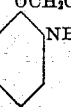

(a) A solution of 8 g. of 4-arsono-2-amino-phenoxyethanol hydrochloride (see Example 4) in 15 cc. 3 N hydrochloric acid and 15 cc. water containing .8 g. potassium iodide was saturated with sulfur dioxide gas for four hours at room temperature. The solution was filtered, cooled in a salt-ice bath and then made neutral to litmus with concentrated ammonium hydroxide. The oxide separated as a white amorphous precipitate. About 5 g. sodium chloride was added. The oxide was filtered off and the filter paper with contents placed in a vacuum desiccator. After standing in the desiccator for twelve hours the last traces of moisture were removed by heating several hours in the vacuum oven at 45° C. The oxide was extracted with 75 cc. warm n-butyl alcohol. The alcohol solution was filtered, diluted with 400 cc. dry ether, filtered, and the residue discarded.

To the n-butyl alcohol-ether filtrate there was added slightly more than three equivalents of hydrogen chloride gas (alcoholic HCl) and immediately a pasty mass separated. During the next few hours this was largely transformed to 4-dicholorarsinoso-2-amino-phenoxyethanol hydrochloride, a white microcrystalline solid. The product was removed by filtration, placed in a mortar, covered with ether containing a little alcoholic HCl, and thoroughly triturated. The solution was again filtered, and the product washed thoroughly with ether and dried several hours in the vacuum oven. Weight 6.0 g., or 71% based on a theoretical yield of 8.5 g. M. P. 174° C.

Analysis: Sub. 0.1874, 0.1874: 22.30, 22.26 cc. of 0.0500 N KBrO$_3$ solution. Calcd. for C$_8$H$_{11}$O$_2$N As Cl$_3$: As 22.40%. Found: As 22.30, 22.26%. Neutral equivalent: 0.1000, 0.1000 g.: Found: 8.28, 8.30 cc. of 0.1057 N sodium hydroxide. Calcd. for C$_8$H$_{11}$O$_2$ N As Cl$_3$, based on three equivalents, 8.49 cc. Subs. 0.2000, 0.2000: 0.2576, 0.2578 g. silver chloride obtained. Calcd. for C$_8$H$_{11}$O$_2$ N As Cl$_3$:Cl 31.81%. Found: 31.86, 31.88%.

(b) A solution of 16 g. of 4-arsono-2-amino-phenoxyethanol hydrochloride in 30 cc. of 3 N hydrochloric acid and 30 cc. of water containing 1.6 g. of potassium iodide was saturated with sulfur dioxide gas for four hours at room temperature. The solution was filtered, cooled in a salt-ice bath, and then made neutral to litmus with concentrated ammonium hydroxide. The oxide separated as a white amorphous precipitate. About 15 g. of sodium chloride was added, the solution filtered while cold, and washed twice with 15 cc. portions of cold water. The filter paper with contents was dried in a vacuum dessicator. Weight, 10 g. of crude oxide. It was dissolved in the minimum volume of 2 N sodium hydroxide, filtered, cooled to 0° C. and reprecipitated with 2 N hydrochloric acid. It was filtered while cold and washed repeatedly with ice water.

The product rapidly became sticky. The filter paper with contents was dried in the vacuum oven at 45° C. The amine was scraped from the paper. Weight, 4.3 g. It was a brittle solid which was powdered to give a light tan-colored powder. It began to soften above 160° C. but did not melt completely below 250° C.

Analysis: (for trivalent As) Subs. 0.1874, 0.1874: 30.60, 30.64 cc. of 0.0500 N KBrO$_3$ solution. Calcd. for C$_8$H$_{10}$O$_3$N As: As, 30.83%. Found: As, 30.60, 30.64%.

The substance dissolves readily in alkalies and acids, slowly in cold ethyl, isopropyl and n-butyl alcohols, readily in hot ethyl, isopropyl and n-butyl alcohols, readily in ethanolamine, slowly in cold ethylene glycol but readily in hot ethylene glycol. The substance is not soluble in diethyl ether, acetone or chloroform.

Example 8

4-Arsono-2-chloro-phenoxyethanol

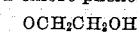
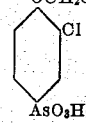

To 50 cc. 3 N hydrochloric acid in a 250 cc. beaker was added 11.7 g. 4-arsono-2-nitro-phenoxyethyl nitrate. (See Example 2.) The beaker was covered with a watch glass and the solution boiled until the volume was about 20 cc. It was cooled, 1 g. of urea added and the solution diluted to 50 cc. and made neutral to litmus with 6 N sodium hydroxide.

Meanwhile 50 g. FeCl$_2$.4H$_2$O was dissolved in 75 cc. of water in a 500 cc. Erlenmeyer flask and the solution made weakly alkaline by adding 6 N sodium hydroxide. The ferrous hydroxide mud thus formed was cooled under the tap. The neutral hydrolysis solution was added and the flask stoppered, cooled with running water for five minutes, and shaken frequently. The mixture was filtered with suction through a 15 cm. Buchner funnel. The filtrate was made neutral to litmus by adding 6 N hydrochloric acid and evaporated nearly to dryness under reduced pressure. The residue was extracted with 25 cc. N/2 sodium hydroxide, filtered, and the filtrate made acid to Congo red paper using 6 N hydrochloric acid. The 4-arsono-2-chlorophenoxyethanol separated as an oil which slowly crystallized at 0° C. The crystals where removed by filtration, redissolved in 20 cc. warm water, decolorized with charcoal, and filtered. The compound separated as white rectangular plates. The yield was 1.64 to 3.36 g. or 18 to 35%. It was dried in the vacuum oven at 45° C. M. P. 141° (uncorr.).

Analysis: Sub: 0.1874, 0.1874: 25.50, 25.50 cc. of 0.0500 N KBrO$_3$ solution. Calcd. for C$_8$H$_{10}$O$_5$ClAs, As 25.27%. Found: As 25.50, 25.50%.

*Example 9*

4-Arsinoso-2-chlorophenoxyethanol

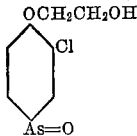

A solution of 2 g. 4-arsono-2-chlorophenoxyethanol in 20 cc. 3 N hydrochloric acid containing .05 g. potassium iodide was prepared by warming gently. The solution was saturated with sulfur dioxide gas and after about five minutes the yellow solution suddenly became milky and the oxide separated as a yellow pasty mass. After standing at room temperature for two hours it was cooled to 0° C. and the solution made neutral to litmus with concentrated ammonium hydroxide. Three grams of salt was added for each 10 cc. of solution and the mixture cooled with a salt-ice mixture. The mixture was filtered, and the precipitate dissolved in the minimum of 3 N sodium hydroxide, diluted with an equal volume of water, filtered and reprecipitated by adding 3 N hydrochloric acid slowly with stirring until neutral to litmus. It was filtered, washed well with water, and dried in the vacuum oven at 45° C. It was purified by again dissolving in alkali and reprecipitating with acid, using the same method as before. Weight 1.10 g. or 62% yield based upon the theoretical yield of 1.77 g. M. P. was not below 250° C.

Analysis: Subs. 0.1874, 0.1874: 28.80, 28.76 cc. of 0.0500 N KBrO$_3$ solution. Calcd. for C$_8$H$_8$O$_3$ClAs. As 28.54%. Found: 28.80, 28.76% As.

*Example 10*

4-Arsono-phenoxy propanol

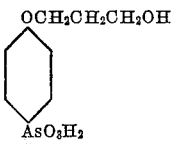

A solution of 54.5 g. of 4-hydroxyphenylarsonic acid in 187.5 cc. of 6 N sodium hydroxide was cooled to 20° C. and placed in a 500 cc. round bottom flask. To this solution was added 47.3 g. (2 eq.) trimethylene chlorohydrin and the solution refluxed for four hours.

The solution was filtered, cooled to 0° C. and 50 cc. of 12 N hydrochloric acid added. The 4-arsono-phenoxy-propanol separated as an oil which changed slowly to a solid when kept for several hours at about 0° C. The oil changed completely to a white crystalline solid which was filtered off, washed with a little water, and sucked very dry. It was recrystallized from about 150 cc. of water. The 4-arsonophenoxypropanol separated as white bobbin-shaped crystals. Weight 30–32 g. An additional yield of 3–5 g. was obtained by concentrating the filtrate. The total yield was about 35 g. or 51% based upon a theoretical yield of 69 g. M. P. 146° C.

Analysis: Sub. 0.1874, 0.1874: 27.08, 27.08 cc. 0.0500 N KBrO$_3$ required. Calcd. for C$_9$H$_{13}$O$_5$As, As 27.15%. Found: 27.08, 27.08% As.

By procedures of the same general type as those described under Examples 2 and 3 for the corresponding ethanol derivatives, 4-arsono-2-nitro-phenoxypropanol nitrate and 4-arsono-2-nitro-phenoxypropanol were prepared. Other alkanol derivatives are similarly prepared.

*Example 11*

Monosodium salt of p-arsono-phenoxyethanol

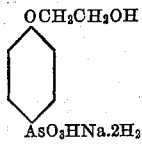

To 38 g. 4-arsono-phenoxyethanol (see Example 1) was added 75 cc. of 2 N sodium hydroxide and the mixture warmed on a water bath. The resulting clear solution was then made just neutral to litmus and water added if necessary to make a clear solution. The warm solution was filtered into 500 cc. absolute ethyl alcohol. The monosodium salt separated immediately as tiny white rods. The product was filtered, washed with a little absolute alcohol, and dried at 110° for 12 hours. Weight 39.3 g. After standing in air for forty-eight hours, weight 43.2 g.

Analysis: Dried at 110°, subs. 0.6551, 0.5334 g.: 92.27, 75.16 cc. 0.0500 N KBrO$_3$ solution required. Calcd. for C$_8$H$_{10}$O$_5$AsNa, As 26.38%. Found: 26.39, 26.41% As.

After standing 48 hours in air,

C$_8$H$_{10}$O$_5$AsNa.2H$_2$O.

Theo. % H$_2$O, 11.25%. Found: 11.11, 11.13%.

*Example 12*

4,4'-(β-hydroxyethoxy)-3,3'-diamino-arsenobenzene

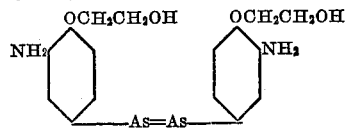

A solution of 1 gm. of 4-arsono-2-amino-phenoxy-ethanol, 2 cc. of water, and 2 cc. of 50% H$_3$PO$_2$ solution was warmed on the water bath for two hours. It was diluted to 75 cc. with water, neutralized with 3 N sodium hydroxide, and the arseno compound separated as a yellow gelatinous mass. It was filtered, washed with 500 cc. water, 50 cc. alcohol and 25 cc. ether.

It was dried in a vacuum desiccator and then at 70° in a vacuum oven. Yield, .8 g. M. P. 159–60° C. Decomposed at about 225° C. It was insoluble in hot ethyl alcohol and ether and soluble in warm ethylene glycol.

Analysis: Subs. 0.1874, 0.1874: 32.40, 32.46 cc. of 0.0500-N KBrO₃ solution. Calcd. for $C_{16}H_{20}O_4N_2As_2$, As, 33.01%. Found: 32.40, 32.46%.

A procedure similar to that described above may be used to prepare the arseno compounds of ortho, meta, or para-arsono-phenoxyethanol, which are insoluble in dilute acids and alkalies, and insoluble in water. Other arseno derivatives may be made in a similar manner.

In the preceding examples of products coming within the purview of my invention, it will be noted that I have shown various modifications of the general formula, but I have not indicated all of the variations to which my invention extends. Thus it is to be understood that the aromatic nucleus may not only be the benzene ring but also other equivalent cyclic compounds capable of having the arsenic linked directly to a carbon atom thereof. Also the alcohol group which is linked through the ether to the aromatic group may not only be from the aliphatic series but also in some instances from the aromatic series as well. In other words, the invention in its broader aspects extends to a wide class of organic arsenicals, the chief chemical characteristic of which is that the arsenic is attached to the nucleus of an aryloxy alcohol group.

What I claim as my invention is:

1. Organic arsenic compounds in which the arsenic is attached to the aryl nucleus of an aryloxy alkanol group.

2. Organic arsenical compounds having an aromatic group joined to arsenic and an oxyalcohol group.

3. Organic arsenical compounds having an aromatic group joined to arsenic and joined to an alcohol group through an ether linkage.

4. Organic arsenical compounds having arsenic attached to the nucleus of a phenoxy alkanol group.

5. Organic arsenical compounds designated by the formula R—O—R′ where R is the aromatic nucleus carrying arsenic as a direct substituent and R′ is an alkyl group containing at least one alcohol group.

6. Organic arsenical compounds designated by the formula R—O—CH₂CH₂OH where R is an aromatic nucleus carrying arsenic as a direct substituent.

7. Organic arsenical compounds designated by the formula R—O—R′ where R is an amino and arsenic substituted benzene nucleus and R′ is an alkyl group containing at least one alcohol group.

8. Organic arsenical compounds designated by the formula R—O—CH₂CH₂OH where R is an amino and arsenic substituted benzene nucleus.

9. Organic arsenical compounds designated by the formula R—O—CH₂CH₂OH where R is an arsenic substituted benzene nucleus.

10. Organic arsenical compounds designated by the formula R—O—CH₂CH₂OH where R is an arsenic substituted benzene nucleus containing an amino group.

11. Organic arsenical compounds designated by the formula R—O—CH₂CH₂OH where R is one of a class consisting of a substituted or unsubstituted benzene nucleus carrying arsenic substituted in the para position to the group —O—CH₂CH₂OH.

12. A para arsenic substituted phenoxyethanol.

13. A para arsenic substituted ortho-amino-phenoxyethanol.

14. A para arsono-ortho-amino-phenoxyethanol.

15. The monosodium salt of para arsono-ortho-amino-phenoxyethanol having the formula

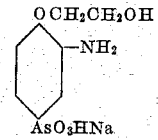

16. 4-Arsono-phenoxyethanol having the formula

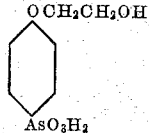

17. Para arsino-ortho-amino - phenoxethanol having the formula

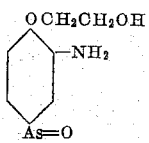

18. In the process of making arsenicals, the step which comprises reacting an arsenic substituted phenol with an alkylene halogen hydrin.

19. In the process of making arsenicals, the step which comprises reacting an arsenic substituted phenol with an ethylene chlorohydrin.

CLIFF S. HAMILTON.